(12) United States Patent
Erdtmann et al.

(10) Patent No.: US 6,508,548 B2
(45) Date of Patent: Jan. 21, 2003

(54) INK JET PRINTING METHOD

(75) Inventors: David Erdtmann, Rochester, NY (US); Huijuan D. Chen, Webster, NY (US); Hwei-Ling Yau, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/742,961

(22) Filed: Dec. 20, 2000

(65) Prior Publication Data

US 2002/0113854 A1 Aug. 22, 2002

(51) Int. Cl.$^7$ ................................. G01D 11/00
(52) U.S. Cl. ...................................... 347/100
(58) Field of Search ................ 347/100; 106/31.13, 106/31.27, 31.4; 523/161, 160

(56) References Cited

U.S. PATENT DOCUMENTS

| | | | |
|---|---|---|---|
| 4,314,263 A | * 2/1982 | Carley | 347/48 |
| 4,460,637 A |   7/1984 | Miyamoto et al. | |
| 4,790,880 A | * 12/1988 | Miller | 106/31.46 |
| 5,518,534 A | * 5/1996 | Pearlstine et al. | 106/31.75 |
| 5,531,818 A | * 7/1996 | Lin et al. | 106/31.28 |
| 5,555,008 A | * 9/1996 | Stoffel et al. | 347/100 |
| 5,877,235 A | * 3/1999 | Sakuma et al. | 523/161 |
| 5,955,515 A | * 9/1999 | Kimura et al. | 523/161 |
| 5,997,622 A | * 12/1999 | Weber et al. | 106/31.48 |

FOREIGN PATENT DOCUMENTS

| | | |
|---|---|---|
| EP | 0 692 528 A2 | 1/1996 |
| EP | 0 983 866 A2 | 3/2000 |
| EP | 1 029 904 A1 | 8/2000 |
| EP | 1 108 757 A2 | 6/2001 |
| EP | 1 127 707 A1 | 8/2001 |
| JP | 08-259863 | 10/1996 |

* cited by examiner

*Primary Examiner*—John Barlow
*Assistant Examiner*—Michael S. Brooke
(74) *Attorney, Agent, or Firm*—Harold E. Cole

(57) ABSTRACT

An ink jet printing method having the steps of:

A) providing an ink jet printer that is responsive to digital data signals;

B) loading the printer with ink-receptive elements containing a support having thereon a porous ink-receptive layer;

C) loading the printer with an ink jet ink composition of a water-dispersible polymeric latex and a water-soluble dye; and D) printing on an ink-receptive substrate using the ink jet ink in response to the digital data signals.

15 Claims, No Drawings

INK JET PRINTING METHOD

CROSS REFERENCE TO RELATED APPLICATION

Reference is made to co-pending U.S. application Ser. No. 09/510,879, filed Feb. 23, 2000, by Chen et al. and U.S. Pat. No. 6,431,700 filed Nov. 10, 2000, by Chen et al.

FIELD OF THE INVENTION

This invention relates to an ink jet printing method which employs a porous receiver and an ink jet composition which provides improved stability to light and other environmental contaminants such as ozone.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

Ozone is generally present in the air at sea level at concentration of about 10 to 50 parts per billion. Under certain conditions, the ozone concentration even exceeds those levels. However, even at the low ozone concentration, dyes such as ink jet dyes can be very sensitive and fade significantly when the air permeability of a receiver is high.

U.S. Pat. No. 4,460,637 relates to a porous ink jet receiver element. However, there is a problem with this element in that when it is printed using a conventional aqueous dye-based ink, the printed image has poor stability to light and other environmental contaminants such as ozone.

JP 08-259863A relates to an ink jet ink composition comprising a water-soluble dye and resin microparticles. However, there is a problem with this ink in that when it is printed onto a conventional, nonporous receiver, the dry time is slow.

It is an object of this invention to provide an ink jet printing method which provides a print having an image which has a fast dry time. It is another object of this invention to provide an ink jet printing method which provides a print having an image which has improved ambient light and ozone stability.

SUMMARY OF THE INVENTION

These and other objects are achieved in accordance with this invention which relates to an ink jet printing method, comprising the steps of:

A) providing an ink jet printer that is responsive to digital data signals;
B) loading the printer with ink-receptive elements comprising a support having thereon a porous ink-receptive layer;
C) loading the printer with an ink jet ink composition comprising a water-dispersible polymeric latex and a water soluble dye; and
D) printing on an ink-receptive substrate using the ink jet ink in response to the digital data signals.

DETAILED DESCRIPTION OF THE INVENTION

The support for the ink-receptive element employed in the invention can be paper or resin-coated paper, plastics such as a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. The thickness of the support employed in the invention can be, for example, from about 12 to about 500 $\mu$m, preferably from about 75 to about 300 $\mu$m.

In a preferred embodiment of the invention the porous ink-receptive layer contains inorganic particles such as silica, alumina, titanium dioxide, clay, calcium carbonate, barium sulfate, or zinc oxide. In another preferred embodiment, the porous ink-receptive layer comprises from about 20% to about 90% inorganic particles and from about 10% to about 80% polymeric binder, such as gelatin, poly (vinyl alcohol), poly(vinyl pyrrolidinone) or poly(vinyl acetate). The porous ink-receptive layer can also contain polymer micro-porous structures without inorganic filler particles as shown in U.S. Pat. Nos. 5,374,475 and 4,954,395, the disclosures of which are hereby incorporated by reference.

A broad range of water-soluble dyes can be used in this invention, such as reactive dyes, direct dyes, anionic dyes, acid dyes, food dyes and the like, such as those described in U.S. Pat. No. 5,973,026, the disclosure of which is hereby incorporated by reference. In a preferred embodiment of the invention the water-soluble dye may be a cationic or an anionic dye.

Examples of cationic dyes which may be used are azo dyes, such as a quaternized pyrazoleazoaniline dye as disclosed in U.S. patent application Ser. No. 09/643,281, filed Aug. 22, 2000, the disclosure of which is hereby incorporated by reference; triarylmethane dyes; azine dyes; phthalocyanine dyes; oxazine dyes or thiazine dyes.

Examples of anionic dyes which may be used are metal-complex dyes, such as transition metal complexes of 8-heterocyclylazo-5-hydroxyquinoline; azo dyes, such as C.I. Direct Yellow 132; phthalocyanine dyes such as C.I. Direct Blue 199; anthraquinone dyes, or anthrapyridone dyes. U.S. Pat. No. 6,183,548, filed Aug. 31, 1999 of Erdtmann et al. discloses examples of the above dyes.

The water-soluble dye used in method of the invention is present in the ink jet ink in any effective amount, generally from about 0.1 to about 10% by weight, and preferably from about 0.5% to about 6% by weight.

The ink jet ink containing the water-dispersible polymeric latex employed in the invention consists of water as a continuous phase and polymeric latex as a dispersed phase. The water-soluble dye and the water dispersible polymeric latex are present in the ink so that the water-soluble dye and the water dispersible latex exist either individually or are physically mixed. In a preferred embodiment of the invention, the polymeric latex meets the following test: At 25° C., the polymeric latex must: (a) be capable of forming a stable dispersion with water at a concentration of from 0.2 to 50 percent by weight, preferably 1 to 20 percent by weight, and (b) when 100 ml of the latex is then mixed in an equal volume of the water-miscible organic solvent described above, stirred and allowed to stand for 10 minutes exhibit no observable coagulation of the polymeric latex. In general, the latex should have an average particle size of <1 μm, preferably <0.5 μm, more preferably <0.05 μm.

The water-dispersible polymeric latex used in this invention are generally hydrophobic polymers of any composition that can be stabilized in an water-based medium. Such hydrophobic polymers are generally classified as either condensation polymer or addition polymers. Condensation polymers include, for example, polyesters, polyamides, polyurethanes, polyureas, polyethers, polycarbonates, poly-acid anhydrides, and polymers comprising combinations of the above-mentioned types. Addition polymers are polymers formed from polymerization of vinyl-type monomers including, for example, allyl compounds, vinyl ethers, vinyl heterocyclic compounds, styrenes, olefins and halogenated olefins, unsaturated acids and esters derived from them, unsaturated nitriles, vinyl alcohols, acrylamides and methacrylamides, vinyl ketones, multifunctional monomers, or copolymers formed from various combinations of these monomers.

The water-dispersible polymeric latex can be prepared in aqueous media using well-known free radical emulsion polymerization methods and may consist of homopolymers made from one type of the above-mentioned monomers or copolymers made from more than one type of the above-mentioned monomers. Polymers comprising monomers which form water-insoluble homopolymers are preferred, as are copolymers of such monomers. Preferred polymers may also comprise monomers which give water-soluble homopolymers, if the overall polymer composition is sufficiently water-insoluble to form a latex. The polymer can be prepared by emulsion polymerization, solution polymerization, suspension polymerization, dispersion polymerization, ionic polymerization (cationic, anionic), Atomic Transfer Radical Polymerization, and other polymerization methods known in the art of polymerization.

Emulsion polymerization is well known in the art and is described, for example, in F. A. Bovey, Emulsion Polymerization, issued by Interscience Publishers Inc. New York, 1955, the disclosure of which is hereby incorporated by reference.

In a preferred embodiment of the invention, the water-dispersible polymeric latex comprises a styrene/acrylic polymer, a polyester or a polyurethane. In a more preferred embodiment of the invention, the water-dispersible polymeric latex has glass transition temperature between Tg of −45 to +90° C. and a particle size of from about 0.005 to about 0.5 μm.

A first class of preferred water-dispersible polymeric latices include those styrene/acrylic polymers prepared by free-radical polymerization of vinyl monomers in aqueous emulsion. Polymers comprising monomers which form water-insoluble homopolymers are preferred, as are copolymers of such monomers, which may also comprise monomers which give water-soluble homopolymers, if the overall polymer composition is sufficiently water-insoluble to form a latex.

Examples of suitable monomers for the styrene/acrylic polymers are well known in the art as disclosed, for example, in U.S. Pat. No. 5,594,047, the disclosure of which is hereby incorporated by reference. In a preferred embodiment of the invention, an ester of acrylic acid, an ester of methacrylic acid, and styrene and styrene derivatives is employed.

A second class of water-dispersible polymeric latices used in the invention may be aqueous dispersible polyesters. The water-dispersible polyester ionomer polymers used in this invention have the following general formula:

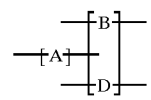

wherein:

A is the residue of one or more diol components which together comprise 100 mole % of recurring units and is represented by the following structure:

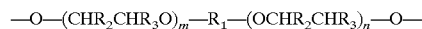

wherein:

m and n independently represent an integer from 0–4;

$R_1$ represents S, an alkylene group of 1 to about 16 carbon atoms; a cycloalkylene group of 5 to about 20 carbon atoms; a cyclobisalkylene group of about 8 to about 20 carbon atoms, a bi- or tri-cycloalkylene group of about 7 to about 16 carbon atoms, a bi- or tri-cyclobisalkylene group of about 9 to about 18 carbon atoms, an arenebisalkylene group of from 8 to about 20 carbon atoms or an arylene group of 6 to about 12 carbon atoms, a carbinol-terminated polydimethylsiloxane segment; and $R_2$ and $R_3$ each independently represents H, a substituted or unsubstituted alkyl group of about 1 to about 6 carbon atoms or a substituted or unsubstituted aryl group of about 6 to about 12 carbon atoms;

B is the residue of a diacid component which comprises 8 to 50 mole % of recurring units and is represented by one or more of the following structures:

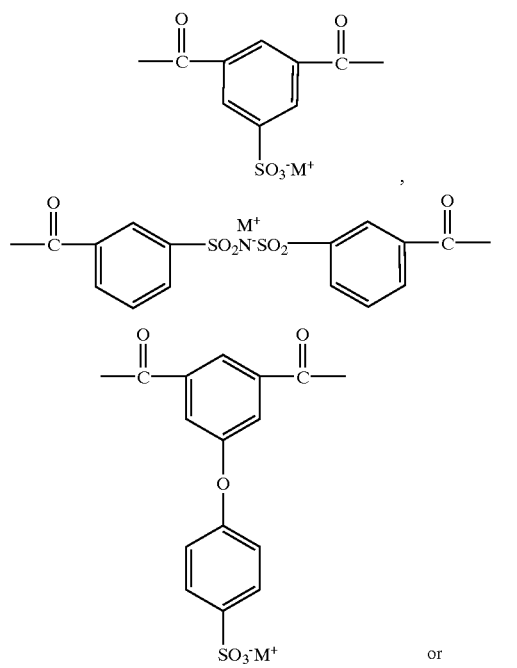

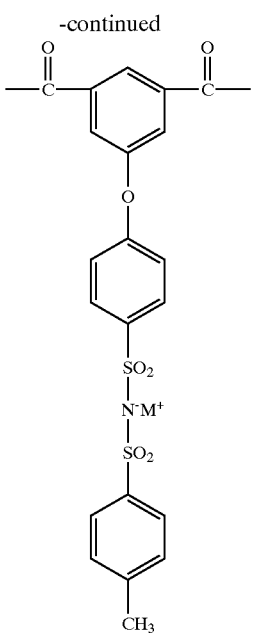

wherein:

M⁺ represents alkali metals, such as Li, Na and K; ammonium groups such as ammonium, methylammonium, triethylammonium, tetralkylammonium, aryltrialkylammonium, etc.; phosphonium groups such as triphenylphosphonium; tetrabutylphosphonium; heteroaromatic ammonium groups such as pyridinium, imidazolium and N-methylammonium; sulfonium groups; guanidinium groups; amidinium groups, etc.; and D is the residue of a diacid component which comprises 50 to 92 mole % of recurring units and is represented by one or more of the following structures:

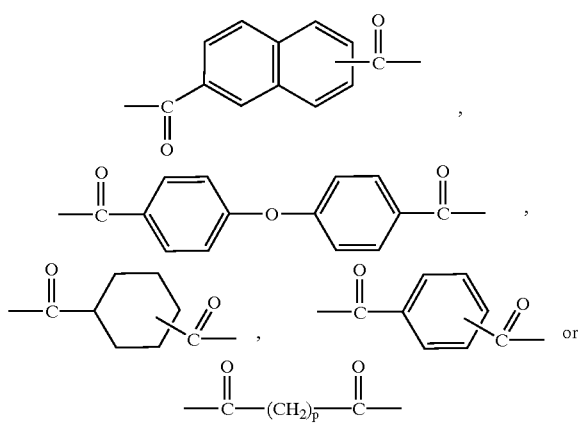

wherein p represents an integer from 2 to 12.

Some typical diols which A in the above formula represents include ethylene glycol, diethylene glycol, triethylene glycol, thiodiethanol, cyclohexanedimethanol, bisphenol A, trans-1,4-cyclohexanediol, dodecanediol, cis-exo-2,3-norbornanediol, 5-norbornene-2,2-dimethanol, hydroquinone bis(2-hydroxyethylether), carbinol terminated polydimethylsiloxane, MW=1000 (DMS-C15), (Gelest Inc.), etc.

Examples of water dispersible polyesters useful in the invention include Eastman AQ® polyesters, (Eastman Chemical Company). Eastman Polyesters AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 0.02 to 0.1 μm.

A third class of polymeric latices used in the invention may be an aqueous dispersible polyurethane. Useful polyurethanes are disclosed in U.S. patent application Ser. No. 09/548,514, filed Apr. 13, 2000, of Yacobucci et al., the disclosure of which is hereby incorporated by reference. These materials may be prepared as described in "Polyurethane Handbook," Hanser Publishers, Munich Vienna, 1985. Examples of aqueous dispersible polyurethanes are Witcobond® polyurethane dispersion by Witco Corp. or Sancure® polyurethane by BF Goodrich Company.

The water dispersible polymer latex used in the current invention is present in the ink jet ink generally from about 0.5% to about 10% by weight.

A humectant is added to the composition employed in the process of the invention to help prevent the ink from drying out or crusting in the orifices of the ink jet printhead. Polyhydric alcohols useful in the composition of the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. As noted above, the humectant is employed in a concentration of from about 10 to about 50% by weight. In a preferred embodiment, diethylene glycol or a mixture of glycerol and diethylene glycol is employed a concentration of between 10 and 20% by weight.

A co-solvent can also be employed in the composition employed in the process of the invention. The selection of a co-solvent depends on the requirements of the specific application, such as desired surface tension and viscosity, the selected colorant, drying time of the ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10% by weight) may also be added to the ink composition employed in the process of the invention to help the ink penetrate the receiving substrate, especially when the substrate is a highly sized paper. A preferred penetrant for the inks of the present invention is n-propanol at a final concentration of 1–6% by weight.

A biocide (0.01–1.0% by weight) may also be added to prevent unwanted microbial growth which may occur in the ink over time. A preferred biocide for the inks employed in the present invention is Proxel® GXL (Zeneca Colours Co.) at a concentration of 0.05–0.5% by weight. Additional additives which may optionally be present in ink jet inks include thickeners, conductivity enhancing agents, anti-kogation agents, drying agents, and defoamers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following example illustrates the utility of the present invention.

EXAMPLE

The following dyes were used in the Example:

Average Molecular Weight

The samples were analyzed by size-exclusion chromatography in tetrahydrofuran using three Polymer Laboratories Plgel™ mixed-C columns. The column set was calibrated with narrow-molecular-weight distribution polystyrene standards between 595 (log M=2.76) and 2170000 (log M=6.34) Dalton. Number average molecular weight and polydispersity (defined as the ratio of weight average molecular weight and number average molecular weight) were reported.

Preparation of Polymer 1 (Aqueous Acrylic Dispersion) Methyl Acrylate/2-Acrylamido-2-Methyl-1-Propanesulfonic Acid, Sodium Salt (96/4)

400 g of deionized water and 0.6 g Olin 10G were charged to a 1-liter three-neck round-bottom flask equipped with a mechanical stirrer and nitrogen inlet. The solution was purged with nitrogen for 30 min and heated to 80° C. in a constant temperature bath. 172.8 g of methyl acrylate and 7.2 g of 2-acrylamido-2-methyl-1-propanesufonic acid (sodium salt) were added and stirred for three minutes. 16.4 g of 10% sodium persulfate solution and 5.5 g of 10% sodium metabisulfite solution were added to initiate the polymerization. Polymerization was continued for one hour and heated one more hour at 80° C. Temperature was

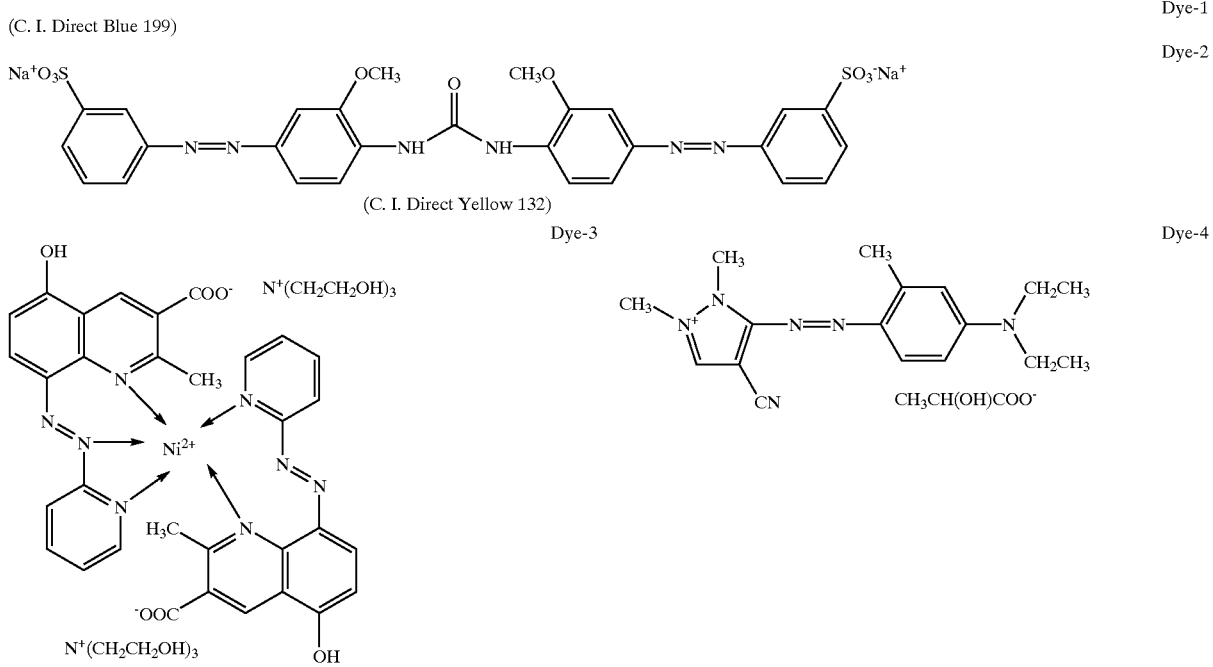

Characterizations of polymeric materials in the following examples were obtained by the following tests or analytical techniques:

Glass Transition Temperature and Melting Temperature

Both glass transition temperature (Tg) and melting temperature (Tm) of the dry polymer material were determined by differential scanning calorimetry (DSC), using a ramping rate of 20° C./minute. Tg is defined herein as the inflection point of the glass transition and Tm is defined herein as the peak of the melting transition.

Particle Size Measurement

All particles were characterized by MICROTRAC II Ultrafine particle analyzer (UPA) manufactured by Leeds & Northrup. The data reported are the size that 50% of the volume in the sample that is smaller than the indicated size, which is also known as the median diameter.

reduced to 65–70° C. and 1 ml each of t-butyl hydroperoxide (10%) and sodium formaldehyde bisulfite (10%) were post-added. Latex was cooled and filtered. Glass transition temperature was 25° C., average particle size was 100 nm, and % solids was 30% by weight.

Preparation of Polymer 2 (Aqueous Polyurethane Dispersion)

In a 1 liter resin flask equipped with thermometer, stirrer, water condenser and a vacuum outlet, 75.07 g polycarbonate polyol KM101733 (Mw=860) was melted and dewatered under vacuum at 100 C. The vacuum was released and at 40° C. was added 10.24 g of dimethylol propionic acid, 21.61 g of 1,4-butanediol, 10.0 g diethylene glycol, 75 g of tetrahydrofuran and 15 drops of dibutyltin dilaurate (catalyst) while stirring. The temperature was adjusted to 75° C. When a homogeneous solution was obtained, 111.47 g isophorone diisocyanate was slowly added, followed by 25 g tetrahydrofuran. The mixture was maintained for about 4 hours to complete the reaction.

The NCO (isocyanate determined by IR analysis) was substantially nil. A stoichiometric amount of potassium hydroxide based on dimethylol propionic acid was stirred in and maintained for 5 min. This was mixed with 1300 g of water under high shear to form a stable aqueous dispersion. Tetrahydrofuran was removed by heating under vacuum to give an aqueous dispersion at 19.5% solids by weight solids. The glass transition temperature was 54.5° C. as measured by DSC, the median particle size was 12 nm as measured by UPA, and the weight average molecular weight was 19,100.

Aqueous Dispersible Polyester

An AQ55® dispersion was commercially available from Eastman Chemical Co., and was used as received at 28% solids by weight. The Tg was 55° C. as measured by DSC and particle size was 20 nm as measured by UPA.

Comparative Ink C-1

To prepare comparative ink jet ink, 4.40 g of Dye 1 (5% active), 0.12 g Surfynol® 465 (from Air Products), 7.0 g glycerol, 4.0 g diethylene glycol, 2.40 g diethyleneglycol monobutyl ether (Dowanol® DB) were added to 22.08 g distilled water. The final ink contained 0.55% dye, 0.30% Surfynol® 465, 17.5% glycerol, 10% diethylene glycol and 6% Dowanol DB. The solution was filtered through a 3 µm polytetrafluoroethylene filter and filled into an Epson SO20089 ink jet cartridge.

Comparative Ink C-2

This ink was prepared similar to Comparative Ink 1 except that Dye 2 was used instead of Dye 1.

Comparative Ink C-3

This ink was prepared similar to Comparative Ink 1 except that Dye 3 was used instead of Dye 1.

Comparative Ink C-4

This ink was prepared similar to Comparative Ink 1 except that Dye 4 was used instead of Dye 1.

Ink 1 of the Invention I-1

An ink similar to Comparative Ink 1 was prepared except that Dye 1 and AQ55® dispersion was used instead of Dye 1 alone. To prepare this ink, 4.40 g of Dye 1 (5% active), 7.14 g of AQ55® dispersion (28% by weight), 0.12 g Surfynol® 465 (from Air Products), 7.0 g glycerol, 4.0 g diethylene glycol, 2.40 g diethyleneglycol monobutyl ether (Dowanol® DB) were added to 14.94 g distilled water. The final ink contained 0.55% dye, 5% AQ55®, 0.30% Surfynol® 465, 17.5% glycerol, 10% diethylene glycol and 6% Dowanol DB. The solution was filtered through a 3 µm polytetrafluoroethylene filter and filled into an Epson SO20089 ink jet cartridge.

Ink 2 of the Invention I-2

An ink similar to Ink I-1 was prepared except that Dye 2 was used instead of Dye 1.

Ink 3 of the Invention I-3

An ink similar to Ink I-1 was prepared except that Dye 3 was used instead of Dye 1

Ink 4 of the Invention I-4

An ink similar to Ink I-1 was prepared except that Dye 4 was used instead of Dye 1.

Ink 5 of the Invention I-5

An ink similar to Ink I-1 was prepared except an acrylic polymer, Polymer 1 was used instead of polyester, AQ55®.

Ink 6 of the Invention I-6

An ink similar to Ink I-1 was prepared except a polyurethane, Polymer 2 was used instead of polyester, AQ55®.

Ink 7 of the Invention I-7

An ink similar to Ink I-5 was prepared except dye 3 was used instead of dye 1.

Ink 8 of the Invention I-8

An ink similar to Ink I-6 was prepared except dye 3 was used instead of dye 1.

Printing

Elements were prepared using test images consisting of a series of 21 variable density patches, approximately 15 by 13 mm in size, ranging from 5% dot coverage to 100% dot coverage printed onto commercially available Konica Photo IJ QP® paper, a porous receiver with an Epson 800 ink jet printer, using the above inks. The elements were allowed to dry for 24 hours at ambient temperature and humidity.

Stability Tests

The above elements were then subjected to low intensity florescent irradiation (1 Klux) for four weeks. Additional elements were subjected to an ozone chamber (~5 ppm ozone level, 50% relative humidity) for 24 hours. The Status A reflection densities of maximum density patch of the elements were measured using an X-Rite® 414 densitometer before and after the fade test. The % retained in Status A density for the 100% dot coverage patches were calculated and listed in Table 1.

TABLE 1

| Element Containing Ink | Fluorescence Light Test (% Retained) | Ozone Test (% Retained) |
|---|---|---|
| C-1 | 101 | 51 |
| I-1 | 100 | 92 |
| I-5 | 100 | 98 |
| I-6 | 100 | 70 |
| C-2 | 96 | 88 |
| I-2 | 100 | 96 |
| C-3 | 9 | 3 |
| I-3 | 60 | 41 |
| I-7 | 67 | 48 |
| I-8 | 62 | 35 |
| C-4 | 95 | 6 |
| I-4 | 101 | 86 |

The above results in Table 1 show that the elements of the invention had improved lightfastness and/or ozone stability as compared to the control elements.

The invention has been described in detail with particular reference to certain preferred embodiments thereof, but it will be understood that variations and modifications can be effected within the spirit and scope of the invention.

What is claimed is:

1. An ink jet printing method, comprising the steps of:

A) providing an ink jet printer that is responsive to digital data signals;

B) loading said printer with ink-receptive elements comprising a support having thereon a porous ink-receptive layer;

C) loading said printer with an ink jet ink composition consisting essentially of a water-dispersible polymeric latex and a water-soluble dye; and D) printing on said ink-receptive substrate using said ink jet ink in response to said digital data signals;

said water-dispersible polymeric latex being a styrene/acrylic polymer; a polyester made from varying amounts of isophthalic acid, sodium sulfoisphthalic acid, diethylene glycol, and 1,4-cyclohexanedimethanol; or a polyurethane.

2. The method of claim 1 wherein said porous ink-receptive layer contains inorganic particles.

3. The method of claim 2 wherein said inorganic particles comprise silica, alumina, titanium dioxide, clay, calcium carbonate, barium sulfate, or zinc oxide.

4. The method of claim 1 wherein said porous ink-receptive layer comprises from about 20% to about 90% inorganic particles and from about 10% to about 80% polymeric binder.

5. The method of claim 4 wherein said polymeric binder is gelatin, poly(vinyl alcohol), poly(vinyl pyrrolidinone) or poly(vinyl acetate).

6. The method of claim 1 wherein said water-dispersible polymeric latex has a Tg of −45 to +90° C. and a particle size of from about 0.005 to about 0.5 $\mu$m.

7. The method of claim 1 wherein said polymeric latex has a average diameter of less than 0.05 $\mu$m.

8. The method of claim 1 wherein said water soluble dye is a cationic dye.

9. The method of claim 8 wherein said cationic dye is an azo dye, a triarylmethane dye, an azine dye, a phthalocyanine dye, an oxazine dye or a thiazine dye.

10. The method of claim 9 wherein said azo dye is a quaternized pyrazoleazoaniline dye.

11. The method of claim 1 wherein said water-soluble dye is an anionic dye.

12. The method of claim 11 wherein said anionic dye is a metal-complex dye, an azo dye, a phthalocyanine dye, an anthraquinone dye, or an anthrapyridone dye.

13. The method of claim 12 wherein said metal-complex dye is a transition metal complex of an 8-heterocyclylazo-5-hydroxyquinoline.

14. The method of claim 12 wherein said azo dye is C.I. Direct. Yellow 132.

15. The method of claim 12 wherein said phthalocyanine dye is C.I. Direct Blue 199.

* * * * *